United States Patent
James

(10) Patent No.: US 7,964,129 B1
(45) Date of Patent: Jun. 21, 2011

(54) TEMPERATURE CONTROL METHOD AND APPARATUS

(76) Inventor: Malcolm Barry James, Campbelltown (AU)

( * ) Notice: Subject to any disclaimer, the term of this patent is extended or adjusted under 35 U.S.C. 154(b) by 0 days.

(21) Appl. No.: 09/719,136

(22) PCT Filed: Jun. 9, 1999

(86) PCT No.: PCT/AU99/00448
§ 371 (c)(1),
(2), (4) Date: Apr. 4, 2001

(87) PCT Pub. No.: WO99/64218
PCT Pub. Date: Dec. 16, 1999

(30) Foreign Application Priority Data

Jun. 11, 1998 (AU) .................................. PP 4033

(51) Int. Cl.
*B29C 33/04* (2006.01)
*B29C 45/78* (2006.01)
(52) U.S. Cl. ..................... 264/237; 165/47; 165/104.19; 264/348; 425/547; 425/552
(58) Field of Classification Search .................. 164/126, 164/128, 348; 249/79; 264/237, 348; 425/143, 425/407, 507, 509, 547, 552; 165/47, 104.19, 165/104.21
See application file for complete search history.

(56) References Cited

U.S. PATENT DOCUMENTS

| | | | |
|---|---|---|---|
| 448,861 A | 3/1891 | Hoyt | |
| 2,292,946 A | 8/1942 | Karig | ................. 123/41.08 |
| 3,644,110 A * | 2/1972 | Sendt | .............................. 65/137 |
| 3,748,866 A * | 7/1973 | Heider et al. | ...................... 62/99 |
| 4,072,181 A * | 2/1978 | Kostura et al. | ............. 164/154.8 |
| 4,197,900 A * | 4/1980 | Bloshenko et al. | ........ 164/147.1 |
| 4,208,177 A * | 6/1980 | Allen | ............................ 425/404 |
| 4,387,762 A * | 6/1983 | Rinderle | .................. 165/104.27 |
| 4,488,861 A | 12/1984 | Reifenhauser | ............. 425/379.1 |
| 4,548,773 A | 10/1985 | Suh et al. | |

(Continued)

FOREIGN PATENT DOCUMENTS

CA  1 251 612  3/1989

(Continued)

OTHER PUBLICATIONS

English translation of JP 62-107853 A, 'Temperature Control Device for Metal Mold', Katsuhiko Takahashi, et al., 14 pages.*

(Continued)

*Primary Examiner* — Yogendra N Gupta
*Assistant Examiner* — Emmanuel S Luk
(74) *Attorney, Agent, or Firm* — ARC IP Law, PC; Joseph J. Mayo

(57) ABSTRACT

An arrangement to assist in heat transfer through a mold for applications such as injection molding of plastics material including at least one closed chamber within the mold, the chamber being only partially filled with fluid and a remainder of the chamber being filled with substantially only vapor of the fluid within the chamber, at least a portion of the chamber being positioned to transmit heat from a targeted location of the mold into fluid within the chamber, and condensing means adapted by reason of heat exchange to effect condensation of vapor within the chamber, the mold being arranged in that the fluid, such as water, is arranged to be held in the chamber in such a way that the fluid will be distributed to reach or be held at different heights within the chamber.

14 Claims, 6 Drawing Sheets

U.S. PATENT DOCUMENTS

| | | | | |
|---|---|---|---|---|
| 4,623,497 | A | * | 11/1986 | Waters .................. 264/40.6 |
| 4,680,001 | A | | 7/1987 | Waters |
| 4,690,789 | A | | 9/1987 | Ritchie et al. |
| 5,161,609 | A | * | 11/1992 | Dutertre et al. ............ 165/267 |
| 5,167,688 | A | * | 12/1992 | Cavazos ..................... 65/83 |
| 5,289,869 | A | * | 3/1994 | Klein et al. ............. 165/273 |
| 5,516,470 | A | * | 5/1996 | Larsson ..................... 264/39 |
| 6,062,299 | A | * | 5/2000 | Choo et al. ................. 165/46 |
| 6,073,683 | A | * | 6/2000 | Osakabe et al. ...... 165/104.33 |
| 6,104,611 | A | * | 8/2000 | Glover et al. ............... 361/700 |

FOREIGN PATENT DOCUMENTS

| | | |
|---|---|---|
| CA | 1251512 | 3/1989 |
| DE | 756867 | 5/1943 |
| DE | 4033677 | 4/1992 |
| FR | 2339427 | 8/1977 |
| JP | 61-148008 | 7/1986 |
| JP | 62-107852 | 5/1987 |
| JP | 62-107853 | 5/1987 |
| SU | 1565709 | 5/1990 |
| WO | WO 9825746 | 6/1998 |

OTHER PUBLICATIONS

English Abstract only DE 40 33 677 Apr. 30, 1992 (Metzeler).

Derwent Abstract Accession No. 31034Y (FR 2339427 Aug. 26, 1977 (Brunswick).

Derwent Abstract Accession No. 91-020636/03 (SU1565709 A May 23, 1990 (Tambovsk).

* cited by examiner

TEMPERATURE CONTROL METHOD AND APPARATUS

CROSS REFERENCE TO RELATED APPLICATION

Not Applicable

BACKGROUND OF THE INVENTION

1. Field of the Invention

This invention relates to a temperature control method and apparatus applicable to machines and has particular application to dies and to moulding of articles using dies in processes such as injection moulding, thermoforming, vacuum forming metal die casting and the like.

2. Description of Related Art

The invention will be described with respect to an application but it is not intended that the concept should be constrained simply to that application.

It is well known that a die can be kept within an acceptable temperature range by use of water passing through passages in the die to a separate heat exchange station.

One of the challenges in the design of dies is to ensure that the working parts of the die have sufficient access to cooling water. This can at times be very difficult indeed if, for instance, there is very little room for appropriate passages for water to be transported to and from a location in sufficient volume.

Such a challenge of keeping the working parts of a die within an acceptable range of temperatures is no small matter and can involve considerable costs in the manufacturing and commissioning of a die. One of the problems experienced is that unless the water is demineralised which is generally uneconomic because of the volume of replacement water needed, then scale build up will occur which again can be costly to treat and can lead to reduced efficiency in cooling over time.

A further problem is the corrosion in the cooling passages caused by their exposure to aerated cooling water.

Further the efficiency of cooling can be a very significant factor in the repetition rate of use of a die. If there were a more efficient way of cooling the die may be able to be used at greater repetition rates which is significant as far as costs of production using the die are concerned.

Further uneven cooling rates between different portions of a moulding die can cause distortion of the moulded parts for which rectification or compensation can be costly.

It is an object of this invention to propose an alternative way to effect temperature control of a machine which at least reduces some of the above difficulties.

BRIEF SUMMARY OF THE INVENTION

In one form of this invention this can be said to reside in a mould of a type requiring heat to be taken from the mould from time to time, characterised in that the mould includes at least one closed chamber having liquid therein which extends to cover at least one of the areas from which heat is to be taken, and a space above the liquid and within the closed chamber, wherein pressure is set at a level which will enable the liquid to boil at a selected temperature and condensing means to effect, by cooling, condensation of vapour of the liquid in the space.

In preference there are more than one chamber and each chamber is shaped and positioned together with the level of liquid therein so that the liquid will access during washing conditions areas in the machine from which heat is to be taken.

In preference the liquid is water.

In preference the mould is a machine for moulding of plastics materials.

In preference the mould is a mould for injection moulding of plastics materials.

In preference the mould is a mould for moulding by thermoforming of plastics materials.

In preference the mould is a mould for the die casting of metals.

In a further preferred form of this invention this can be said to reside in a mould having an internal cooling arrangement which includes a closed chamber having therein a liquid with a volume such that it has an upper level above one of the areas of the mould to be cooled and substantially only the vapour of the liquid within the chamber above the upper level of the liquid.

In a further preferred form of this invention this can be said to reside in a mould for injection moulding of plastics materials having an internal cooling arrangement which is a closed chamber partially filled with a liquid with an upper level sufficient that areas of the die within the chamber adjacent to parts of the die to be cooled will be accessed by the liquid and, in the space in the chamber above the liquid, substantially only the vapour of the liquid.

In a further preferred form of this invention this can be said to reside in a mould for injection moulding of plastics materials having an internal cooling arrangement which is a closed chamber partially filled with a liquid with an upper level of sufficient height so that one of the areas of the mould within the chamber adjacent to parts of the mould to be cooled is covered by the liquid and, in the space in the chamber above the liquid, substantially only the vapour of the liquid, and an arrangement to provide cooling of any vapour within the space in the chamber above the liquid level to effect at least some condensation of the vapour thereby.

In preference there is at least in addition, a heating means located within the chamber within the liquid such that during a standby time, the temperature of the mould can be kept within a selected range of temperatures.

In preference the cooling means include a tube, a core in the tube and means to direct cooling water through the tube.

In a further preferred form of this invention this can be said to reside in a method of cooling of parts of a mould where the mould has at least one closed chamber having liquid therein which extends to cover at least one of the areas from which heat is to be taken, and a space above the liquid and within the closed chamber in which the pressure is caused to be at a level at which the temperature of the boiling point of the liquid will be to at least a selected extent below the temperature of the area from which heat is to be taken and there are condensing means to effect, by cooling, condensation of vapour of the liquid in the space.

In a further preferred form of this invention this can be said to reside in a method of cooling of parts of a mould where the mould has at least one closed chamber having liquid therein which extends to cover at least one of the areas from which heat is to be taken, and a space above the liquid and within the closed chamber in which the pressure is caused to be at a level at which the temperature of the boiling point of the liquid will be at least a selected extent below the temperature of the area from which heat is to be taken this being by reason of, as a first step, filling of the closed chamber with the liquid and then extracting a sufficient proportion of the liquid without allowing air to replace the extracted liquid, and passing at a selected cooling temperature, liquid through condensing means to effect, by such cooling, condensation of vapour of the liquid in the space.

In use then condensation of the vapour may be effected by providing a heat exchange either by an independent member within the space above the liquid level or by having a portion or all of the wall defining the chamber in an area above the liquid surface which is at a lesser temperature but in any event, so that there will be a reasonably effective exchange of heat from the vapour of the liquid so that this then condenses back into liquid and will flow back into the body of the liquid within the closed chamber.

The portion of the chamber to receive heat will, by reason of a raised temperature of the immediately adjacent liquid to a level of that of liquid in adjacent areas, effect an exchange of state of the liquid in this area to vapour which by reason of the latent heat capacity of the vapour will be a very substantial carrier of heat. By reason of relative densities then, the vapour thus formed will rise to the surface of the liquid, continuing to fill the space above the liquid where continuing condensation is being effected by a reverse exchange of heat.

The boiling of the liquid occurs in a very vigorous manner because at very low pressures the volume of vapour produced is very high compared with the volume of liquid being vapourised. This raises the effective level of the liquid relative to a rest state, enabling it to affect areas of the mould that are above its rest level.

What we have then is a closed chamber with its selected liquid operating so that it is at a temperature and pressure governed by its own vapour pressure and by external inputs of heat.

A number of variations can be incorporated within the general concept.

In a first method, the internal chamber is filled entirely with the liquid to be used. In preference, such liquid is previously treated so as to remove dissolved gases and other impurities so that in preference, the liquid is a liquid without impurities which may otherwise interfere with the process or the efficiency in general of the process.

Once full and sealed, the chamber is then accessed through a gate valve so that some of the liquid is then extracted with a pump to a level that is chosen such that the level will be below a condensation member or means within the upper part of the chamber, and that there will be liquid in contact with a heat source which is to provide the heat to be dissipated.

In a further preferred method the chamber can be partially filled to a required level and the residual air can be removed to a sufficient extent by a conventional vacuum pump capable of achieving residual pressures of less than 13 milibars.

Following these steps, the mould is then ready to be used where there is a heat exchanger in an upper part of the internal chamber to provide heat exchange where a further liquid is pumped through the heat exchanger at a preferred mould operating temperature but in preference not a low enough temperature to cause freezing of the liquid.

It is expected at this stage that the liquid would normally be water but it is understood that there are many liquids other than water that would provide a good effect.

For each individual circumstance, the degree of heat to be shifted, the extent of the hot surfaces to be cooled, and the general temperature that has to be worked on, need to be considered to take into account the overall shape and dimensions of the chamber, the fluid to be used, the degree of vapour space above the liquid level, and the condensing means within the vapour space.

In experiments so far conducted, such an arrangement provides very effective and relatively uniform heat transfer.

While reference has been made to a chamber, this does not of itself exclude the case where there can be separate chambers connected by sealed conduits.

A chamber then is to be considered as a concept broad enough to encompass any closed environment.

BRIEF DESCRIPTION OF THE SEVERAL VIEWS OF THE DRAWINGS

For a further explanation of the invention this will be described with reference to a further embodiment which shall be described with reference to an accompanying drawing wherein.

DETAILED DESCRIPTION OF THE INVENTION

Figure 1:
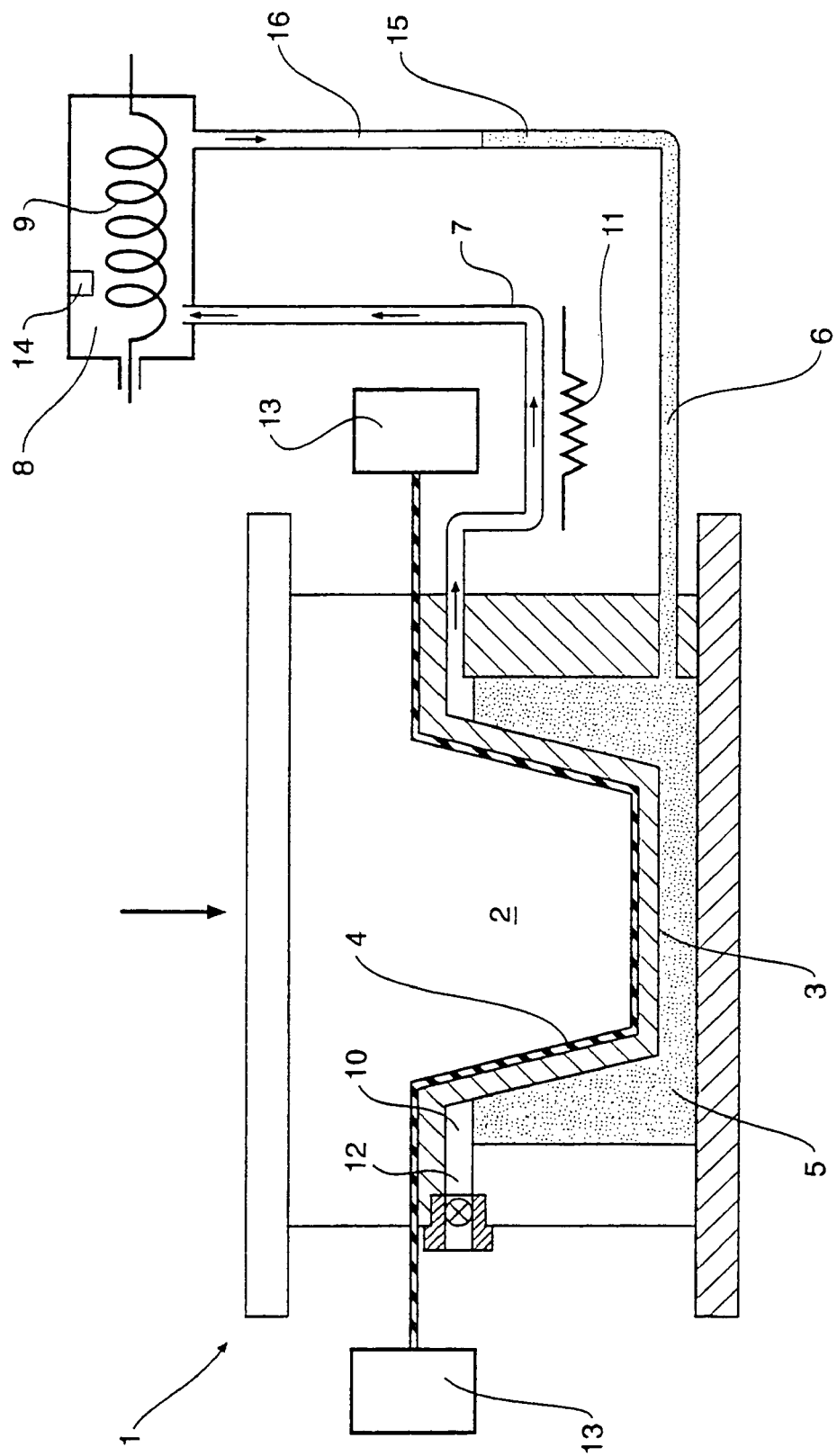
FIG. 1 is a schematic cross sectional view of a thermoforming apparatus in accordance with a first embodiment.

Referring in detail to FIG. 1 there is shown a thermoforming apparatus 1 with a plug 2 arranged to push plastic sheet into a shaping cavity 3. The sheet 4 is subject to conventional treatment including having air at pressure drive the formed sheet 4 into close conforming shape of the cavity 3.

The cavity 3 is surrounded by a hollow body 5 which defines a closed chamber together with conduits 6 and 7 and condensing container 8. Within the condensing container 8 is a heat exchange coil 9 which is supplied with appropriate cooling refrigerant.

Conduit 7 passes beneath plastic sheet holding means 13 and therefore could cause a liquid blockage to passage of vapour through to the condensing container 8.

This effect can be removed by introducing additional heat through heating coil 11 which will effect a vaporisation of the liquid at this location.

Initial startup of this apparatus is achieved by filling the chamber which includes the hollow body 5, the conduits 6 and 7 and the container 8 with water. Through the valve 12 water is then extracted until its level is lowered to a level as shown at 15. This then leaves an upper evacuated space 16 which will then be filled implicitly by substantially only the vapour of the liquid.

From here on the arrangement will remain as a closed system so that heat from the wall of the cavity 3 will be converted into latent heat of vaporisation with the vapour reaching the condensing chamber 8 to be returned to liquid as it gives up the latent heat of vaporisation to the heat exchange coil 9.

Now referring to FIGS. 2 through to 5, there is shown specifically in FIGS. 2, 3 and 5 the male side of an injection die and for ease of description, reference will be made to these parts and then later to the female side of the die as more generally shown in FIG. 4.

Accordingly, the male form 17 is attached through appropriate bolts which are located at position such as at 18 to a bloc 19 which together with a backplate 20 forms a closed chamber 21 which holds a selected quantity of water shown generally at 22. Male form 17 and block 19 may be formed as a single piece.

The water 22 does not totally fill the enclosed and closed space 21 thereby leaving a space 23 above an upper level of the water 24.

There is a heat exchanging cooling device at 25 which is arranged by reason of tube 26 which has a plurality of fins 27 to effect a cooling of water vapour as it exists within the space 23.

The temperature of the fins 27 is governed by arranging for flow of cooling water through an inlet 28 which then proceeds through the centre of a removable core 29 to an end 30 where the water then is caused to pass through a spirally shaped gap 31 so that it will pass fully the length of the hollow core 29 to then exit through passageway 32.

An advantage of this arrangement is that the hollow core 29 is held by plug 33 so that from time to time, the core can be easily removed without affecting the status of the evacuated space 23 and any build up of deposits, debris or otherwise can be then effectively cleaned.

A gate valve 34 is adapted to effect a closure of aperture 35 and evacuation port 44 and there is a further closable plug at 36.

In order to charge the die, water is first vigorously boiled for at least one minute so as to reduce possible dissolved gas from the water.

In order to change the die, water is first vigorously boiled for at least one minute so as to reduce possible dissolved gas from the water. The water is then poured into the chamber 21 through aperture 35 so that it will fully fill the chamber. The gate valve 34 includes a pair of sealing members 45 thereon which act so that when open, water can be extracted from the chamber through evacuation port 44 while maintaining the closure of aperture 35 and when closed, to prevent air from flowing into the chamber through the evacuation port 44.

The amount of water removed is such as to provide a sufficient space above the selected water level to allow for the cooling device to operate within the environment generally only of the water vapour and not the liquid water.

Figure 2:
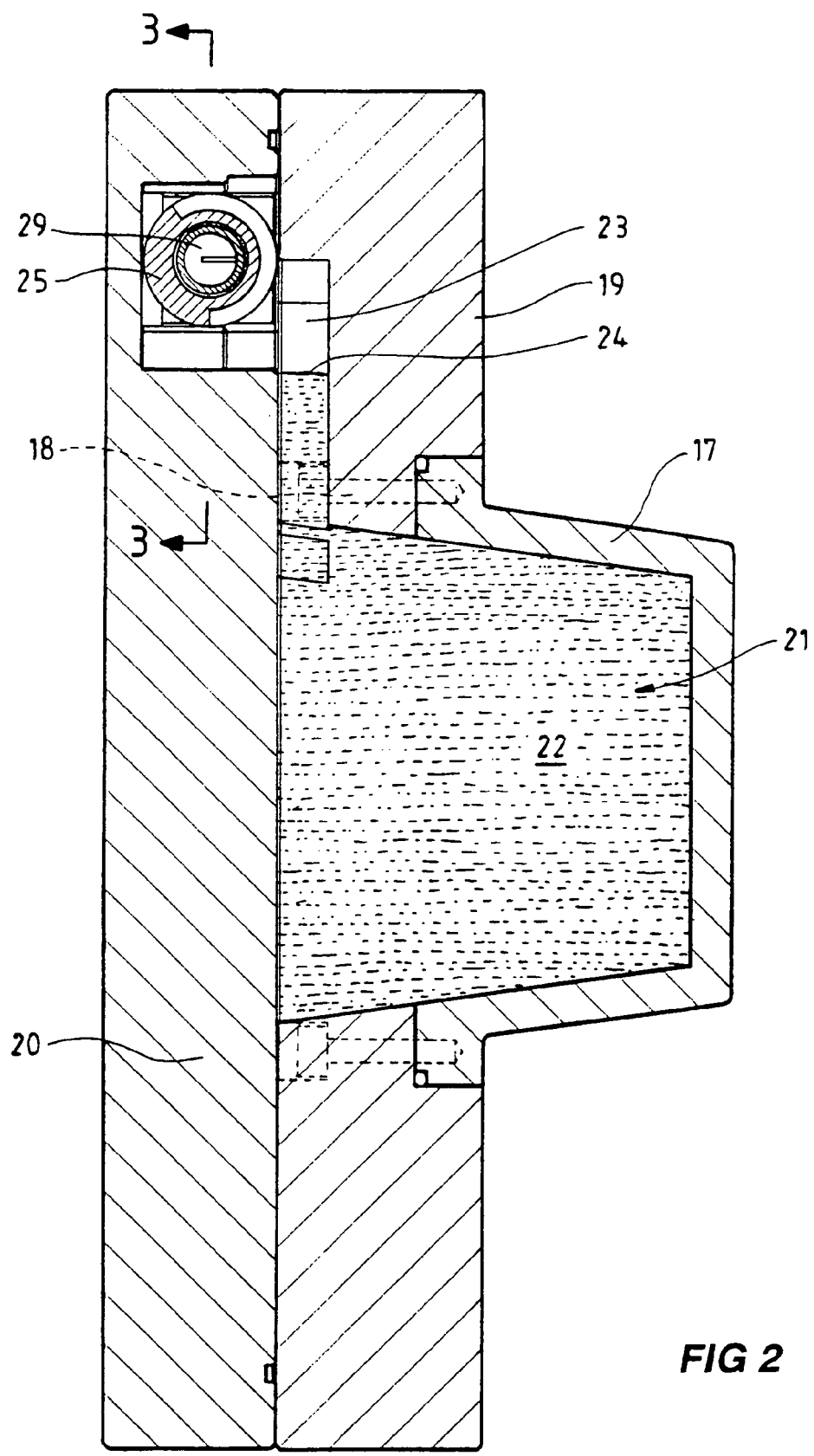
FIG. 2 is a cross sectional view of the male side of a plastic injection die.
Figure 3:
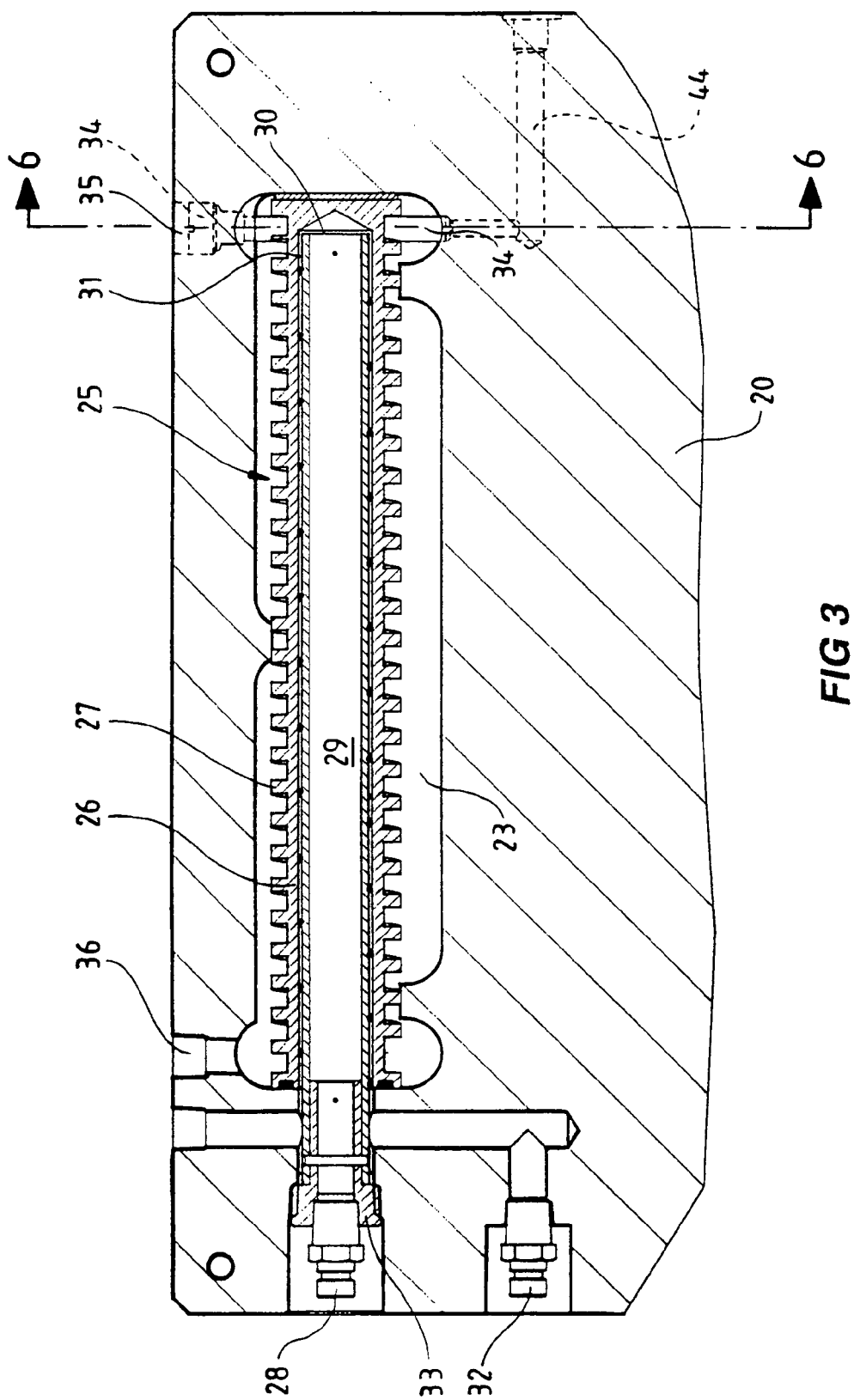
FIG. 3 is a cross sectional view along the lines 3-3 in FIG. 2 of the second embodiment.

With the then degassed water partially filling the closed chamber 21, it will be seen that the water then covers or can access during operation those parts of the die as shown, for instance, in FIG. 1 or FIG. 2 which are immediately adjacent those areas that will be in contact with heated plastics materials and from which heat is to be extracted.

By reducing the pressure within the closed chamber 21, the water adjacent to the hotter parts of the die will be caused to boil at temperatures somewhat lower than 100 degrees Centigrade (212 degrees Fahrenheit) and because of the high value of the latent heat of evaporation of water such effect results in very efficient extraction of heat from the hotter parts of the die.

By reason of the orientation of the die, and by reason of shaping of the internal parts of the die so that vapour when formed can rise into the uppermost space within the closed chamber 21, this then will further concentrate water vapour in the space which in turn will be cooled and therefore be condensed by heat exchange from the heat exchanger system.

While different methods of preparing the status of liquid within the closed chamber 21 can be used, and there has been described in a general way, such an arrangement, in a further method, there is firstly provided a funnel with a spout threaded to fit the inlet or filling port to a capacity greater than the volume of water to be removed from the filled enclosed chamber 21.

A reciprocating vacuum pump with a single stroke capacity equal to the volume of water to be removed is attached to an evacuation port.

Once the water has filled the chamber, the vacuum pump can be used so as to withdraw and then return a number of times so as to cause water within the system to surge back and forth so as to assist in removal of any significant air bubbles which may have been trapped while filling.

The chamber is then again topped up with water on the basis that some air has been dislodged and driven to the surface of the water and the inlet or filling port is then closed.

The vacuum pump can again be caused to withdraw and return a number of times so as to cause water in the system to surge back and forth. With each withdrawal, the pressure inside the chamber will be considerably reduced and any remaining trapped bubbles of gas will expand and most will rise to the surface of the water.

The vacuum pump stroke is then returned and the chamber is again topped up with water and the inlet port is closed.

With a full stroke of the vacuum pump the required amount of water will be extracted and the gate valve 34 is then screwed in to close the evacuation port 44.

In this process, it is provided that the gate valve 34 allows the water to gravitate easily into the pump. Since air is excluded substantially, gravity is needed to move the liquid into the vacuum pump.

Figure 4:
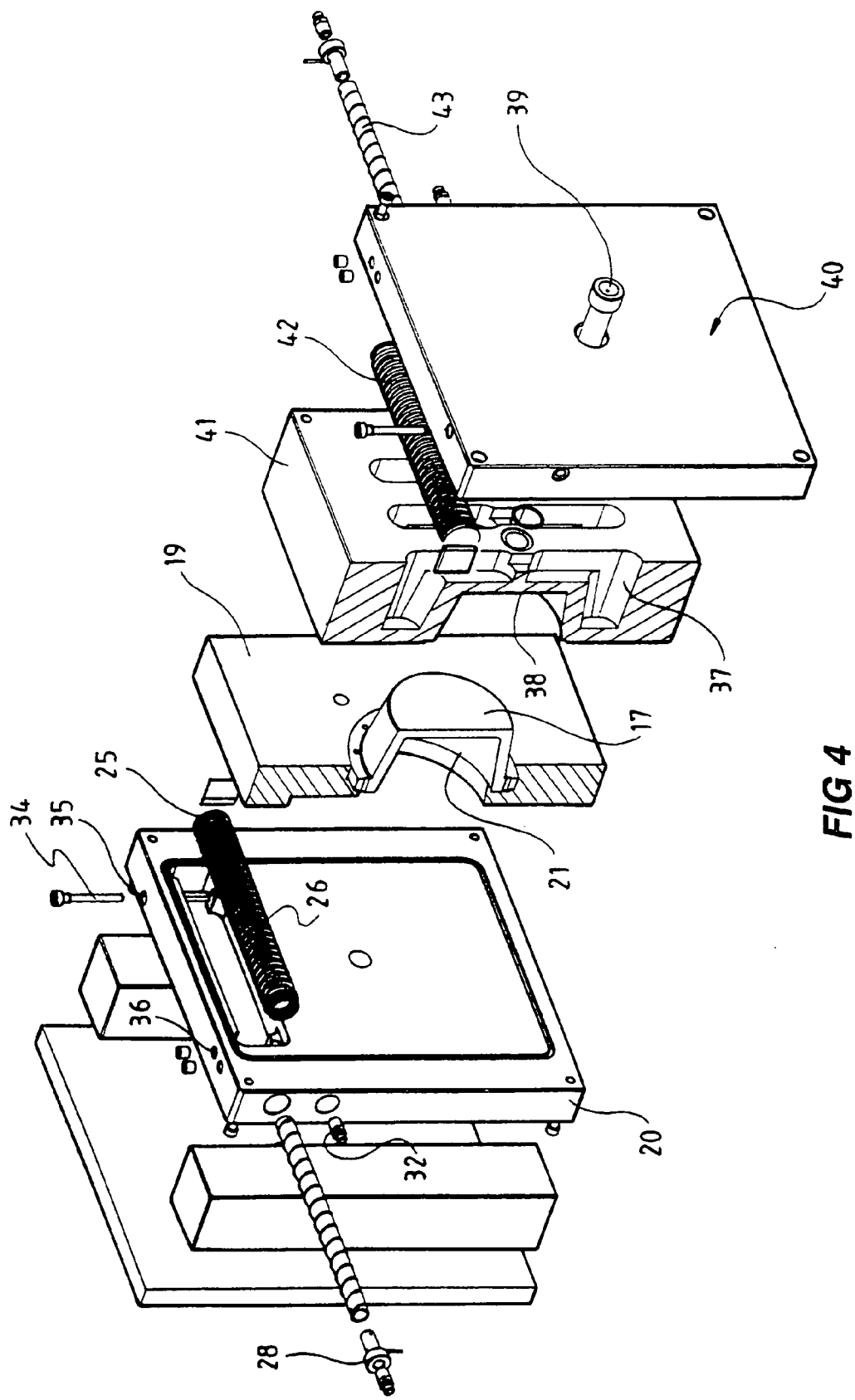
FIG. 4 is an exploded perspective view of the plastic injection die, the male side of which is shown in FIGS. 2 and 3.
Figure 5:
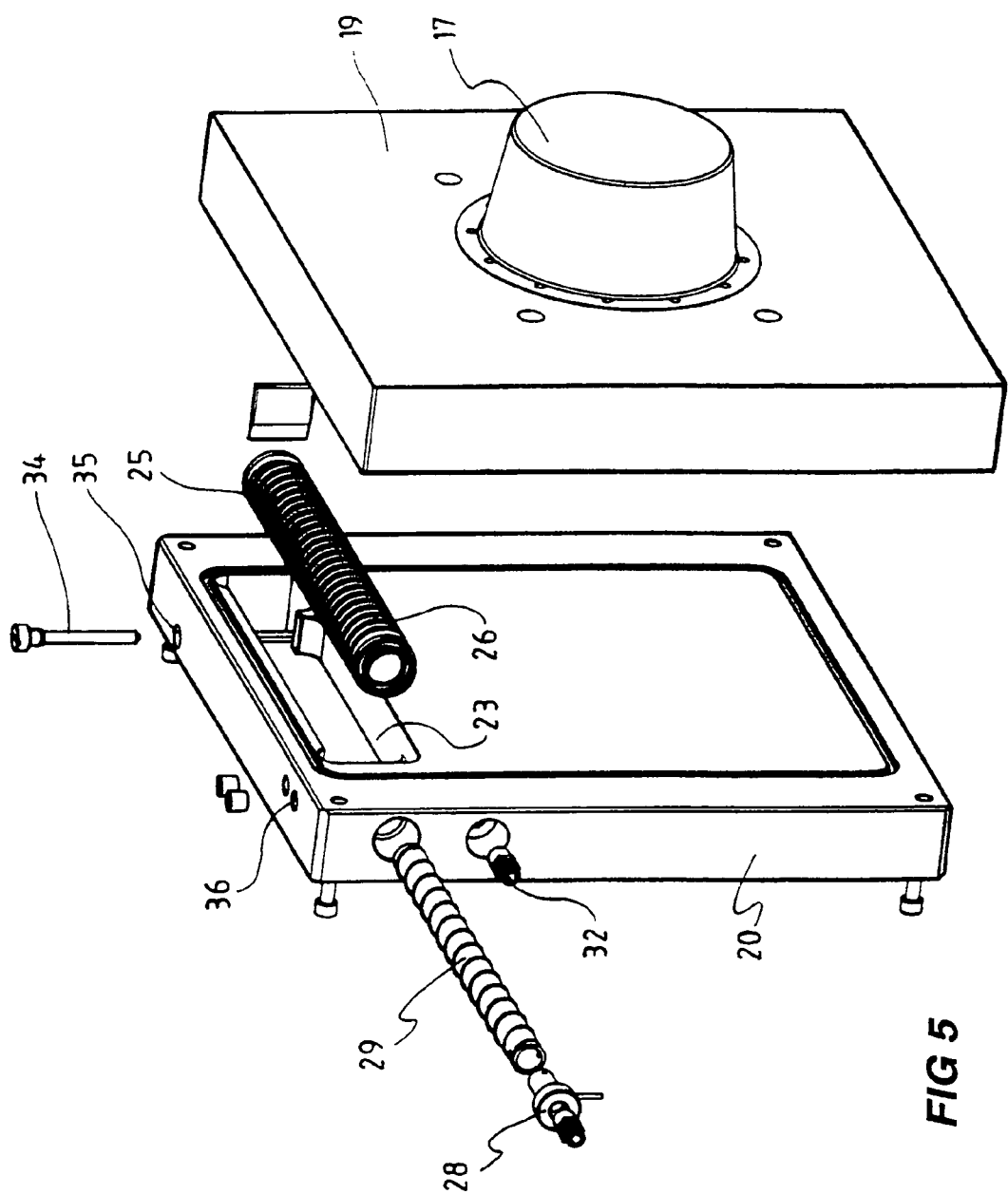
FIG. 5 is an exploded perspective view of the parts forming the portion of the second embodiment as shown in FIGS. 2 and 3.
Figure 6:
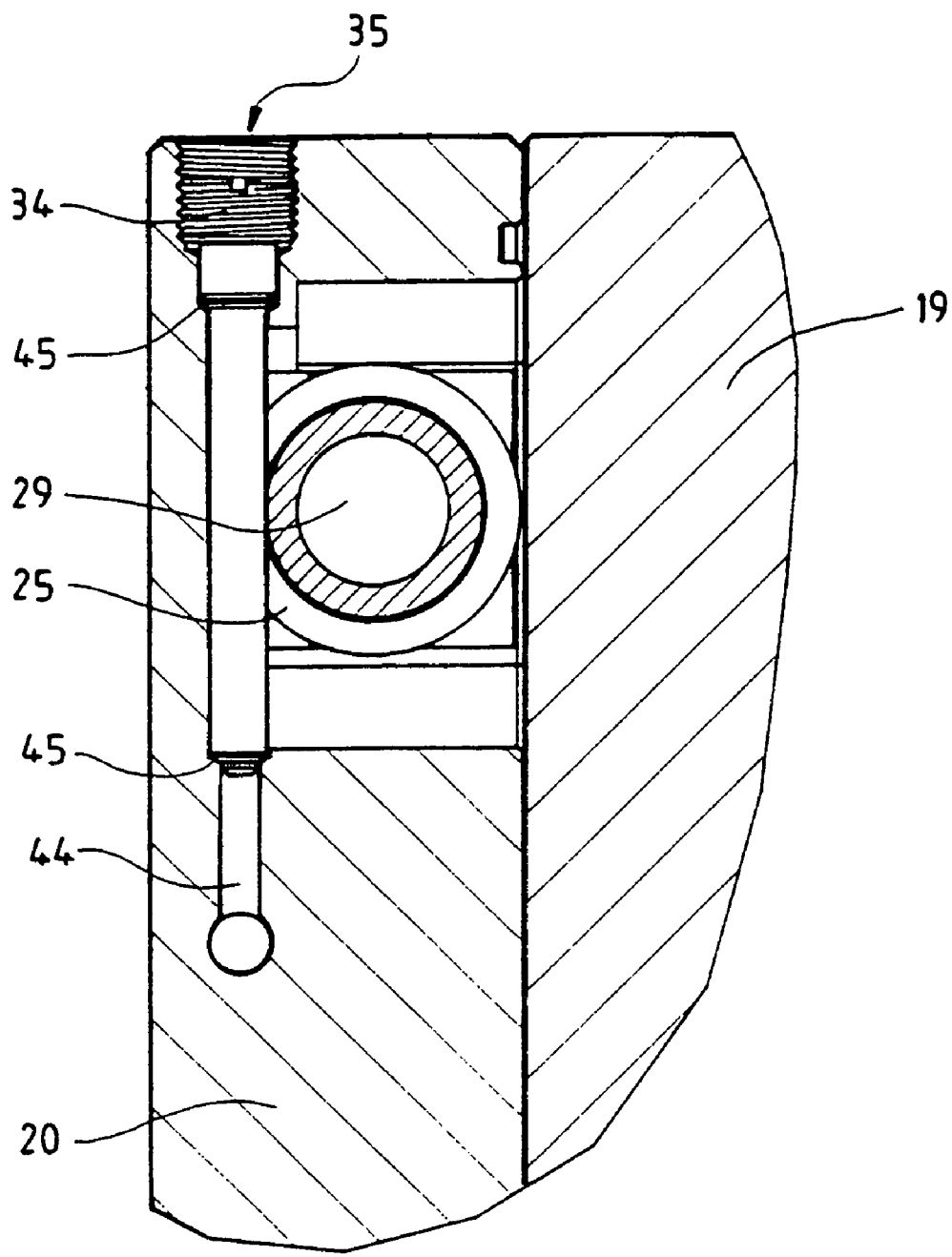
FIG. 6 is a section along the lines 6-6 in FIG. 3.

This describes, as has been previously stated, one side of an injection die where the further portion of the injection die is shown in exploded detail in FIG. 4. In this case then, there is a closed chamber 37 which surrounds a female shape 38 into which the male part 17 is located to form there between a moulding space served by inlet port 39.

A back plate 40 has sealed engagement with the die 41 and there are shown heat exchange means at 42 with a hollow removable core 43.

The filling procedure of this side of the die is the same as with the first male portion of the die.

One of the advantages of the arrangement described is that the temperature of the die is automatically evened out because boiling will occur preferentially at the higher temperature locations thereby reducing its temperature to that of its surrounding areas.

Consequently, with this system, there is a preferential evening effect of the temperature which means that more sophisticated techniques for attempting to keep temperatures even are no longer necessary.

The mould temperature, for instance, can be controlled very evenly and effectively by controlling the flow of coolant such as water, through the heat exchanger. This leads to the further arrangement including the location of a thermostat so as to respond to the temperature of the liquid in the closed chamber.

Accordingly, this can be connected through a servo controller so as to interrupt flow of coolant liquid through the heat exchanger whenever the temperature falls below a selected value and can restore or increase the flow rate of cooling liquid whenever the temperature of the fluid in the enclosed chamber rises above another slightly higher selected level.

EXPERIMENTAL RESULTS

A prototype unit has been made and tested. This unit was manufactured as the male portion of the injection die which is the arrangement as shown in FIGS. 2, 3 and 5 with a face area of 250 mm and of course the disclosed protruding core, 70 mm in diameter and 55 mm long. The enclosed chamber then had a wall thickness at the die portion of 12 mm.

The described method of effecting a charging of water which had been degassed and then having a portion removed to leave only water vapour in a space was applied.

The effectiveness of the cooling action described was tested as follows:

1. Coolant water was supplied to the heat exchanger at a temperature of 27 degrees Centigrade which was the ambient temperature at the time of the test.
2. Two gas blow torches were directed at the surface of the core and kept continuously heating on the outer surface of the protruding die surface. The temperature of the coolant, of the core and of water in the enclosed chamber were monitored using digital pyrometers.
3. The flow rate of coolant through the heat exchanger was adjusted to achieve a flow rate of four liters per minute.
4. The output of the blow torches was adjusted until a temperature rise of 2.7 degrees Centigrade in the coolant was achieved. This corresponded to a heat extraction rate of 750 watts.
5. The temperature of the die was found under these conditions to reach and be sustained at 48 degrees Centigrade which is to say 21 degrees Centigrade above the coolant temperature.
6. The temperature of water in the enclosed chamber was stabilised and was 35 degrees Centigrade.

Direct calculation of an expected temperature of the core, based on its geometry and the test conditions, were also made. The calculated temperature differential through the walls of the core is 12 degrees Centigrade and this was found to correspond very well with the experimental result. The remainder of the temperature differential (8 degrees Centigrade) is a function of the efficiency of the heat exchanger.

It is considered from the above experimental results that these illustrate a very outstanding effective result which will be of very significant value in many applications where moulds are to be cooled and where achieving a uniformity of the cooling effect is of value.

Further, because the closed chamber keeps the same water through the full cooling process, it is not expected that there will be mineral deposit or any significant corrosion (as a result of the absence of air).

While in preference only water is used, other liquids or mixtures of liquids can be used and, in such a case, it is substantially only the vapours of the liquids that will exist only in the space above the level of the liquid in the closed chamber.

The claims defining the invention are as follows:

1. A method of uniformly cooling of a molding surface of a mold for dies and molding of articles using dies wherein the mold comprises at least one completely closed chamber having air substantially removed therefrom and having a single quantity of liquid therein which extends to cover at least one area adjacent to and on an opposite side of the molding surface of said mold, wherein said molding surface comprises a separating wall or walls having a uniform thickness through all of the wall or walls through which cooling is effected and wherein the level of the liquid is sufficient to cover all of said at least one area including said wall or walls of the chamber from which heat is to be taken and wherein each of said at least one completely closed chamber being integrated within the mold and a space above the single quantity of liquid and within the completely closed chamber in which pressure within the space is caused to be set at a level which will enable the single quantity of liquid to boil at a selected temperature, said selected temperature being at a level such that the temperature is below a temperature of the at least one area adjacent to the molding surface this being by reason of, as a first step, filling of the completely closed chamber with the single quantity of liquid and then extracting a selected portion of the single quantity of liquid without allowing air to replace the extracted liquid, and passing at a selected cooling temperature, the single quantity of liquid through condensing means to effect, by such cooling, condensation of vapor of the single quantity of liquid in the space to return the condensed vapor to the single quantity of liquid by gravity.

2. The method as claimed in claim 1 wherein the single quantity of liquid is water.

3. The method as claimed in claim 1, wherein the mold is a die, and includes at least a heating means located within the completely closed chamber within the liquid such that during a standby time, the temperature of the die or mold can be kept within the selected temperature.

4. A method of uniformly cooling of a molding surface of a mold for molding of articles wherein the mold comprises at least one completely closed chamber having air substantially excluded therefrom and having a single quantity of fluid therein, the liquid portion of the fluid extends to cover at least one area adjacent to and on an opposite side of the molding surface of said mold, wherein said molding surface comprises a separating wall or walls having a uniform thickness through all of the wall or walls through which cooling is effected and wherein the level of the liquid is sufficient to cover all of said at least one area including said wall or walls of the chamber from which heat is to be taken and wherein each of said at least one completely closed chamber being integrated within the mold and a space above the liquid portion of the single quantity of fluid and within the completely closed chambers in which pressure within the space is caused to be set at a level which will enable, whenever there is a temperature differential between any two locations within the chamber, the liquid portion of the single quantity of fluid to boil at the location with the higher temperature and the resultant vapor to condense at the location with the lower temperature, such effect being used to maintain a substantially uniform temperature throughout the completely closed chamber which is also maintained at a selected temperature by providing, in the space above the liquid portion of the single quantity of fluid, a condenser which is adapted to have its temperature kept at a lower temperature than that of a location from which heat is to be taken this being by reason of, as a first step, having filled the completely closed chamber with the single quantity of fluid and then extracting a measured portion of the fluid within said completely closed chamber to leave within the chamber only the single quantity of fluid, a portion of which will be in the liquid phase and the remainder of which will be in the vapor phase.

5. The method as claimed in claim 4, where there is an arrangement within the completely closed chamber whereby the vapor of the single quantity of fluid is caused to be condensed by heat transfer to the condenser and to then return as liquid to the liquid portion of the single quantity of fluid.

6. A method of effecting heat transfer within a mold to assist in effecting substantial uniformity of temperature of molding surfaces of a molding cavity integrated within said mold, at least one adjacent closed chamber adjacent to the molding cavity, a separating wall or walls between the cavity and the chamber having a uniform thickness through all of the wall or walls through which cooling is effected and wherein the level of the liquid is sufficient to cover all of at least one area including said wall or walls of the chamber from which heat is to be taken and selected fluid filling to an extent to effect substantial exclusion of any other fluid, the closed chamber so that there is both a liquid portion and a saturated vapor portion of the said fluid within the chamber and only this fluid, and a condenser within the chamber.

7. The method as claimed in claim 6, wherein the fluid is a single selected fluid and subject to exclusion of any other fluid, and the level of the liquid portion is sufficient to cover an area or areas of the said wall or walls of the chamber from which heat is to be taken.

8. The method as claimed in claim 6 for molding a product including introducing a material to be molded into the mold where there is effected heat transfer within the mold for achieving the substantial uniformity of temperature of a substantial portion of the molding surfaces of the molding cavity.

9. The method as claimed in claim 6, wherein said at least one adjacent closed chamber adjacent to the molding cavity is within the mold, the said wall or walls between the molding cavity and the chamber having a substantially uniform thickness.

10. The method as claimed in claim 8, wherein said at least one adjacent closed chamber adjacent to the molding cavity is within the mold, the said wall or walls between the molding cavity and the chamber having a substantially uniform thickness.

11. The method as claimed in claim 8, wherein the level of the liquid portion is sufficient to cover an area or areas of the said wall or walls of the chamber from which heat is to be taken, and within the space above the liquid portion of the fluid, such space containing substantially only the vapor of the fluid, the pressure in the space thereby being substantially equal to the vapor pressure of the fluid which results in, upon there being a temperature differential between any portion of the surface of the wall or walls and a cooler portion of the surface of the wall or walls within the space, some liquid of the fluid boiling at the said higher temperature location and effecting thereby removal of heat as latent heat of vaporization from the higher temperature location through a phase conversion of the fluid to a vapor and thereafter effecting, by condensation of the vapor which effects release of its latent heat of vaporization at said lower temperature location in the space above the said liquid whereby to reduce said temperature differential and, by condensation of vapor at a condenser which is cooled from time to time so as to control the temperature of the fluid to be within a selected range.

12. The method as claimed in claim 10, wherein the level of the liquid portion is sufficient to cover an area or areas of the said wall or walls of the chamber from which heat is to be taken, and within the space above the liquid portion of the fluid, such space containing substantially only the vapor of the fluid, the pressure in the space thereby being substantially equal to the vapor pressure of the fluid which results in, upon there being a temperature differential between any portion of the surface of the wall or walls and a cooler portion of the surface of the wall or walls within the space, some liquid of the fluid boiling at the said higher temperature location and effecting thereby removal of heat as latent heat of vaporization from the higher temperature location through a phase conversion of the fluid to a vapor and thereafter effecting, by condensation of the vapor which effects release of its latent heat of vaporization at said lower temperature location in the space above the said liquid whereby to reduce said temperature differential and, by condensation of vapor at a condenser which is cooled from time to time so as to control the temperature of the fluid to be within a selected range.

13. The method as claimed in claim 6 for operating a mold where there are means for effecting the heat transfer within the mold to effect substantial uniformity of the temperature of the molding surfaces on molding surfaces defining the molding cavity, and in which the level of the liquid portion is sufficient to cover an area or areas of the said wall or walls of the chamber from which heat is to be taken, and within the space above the liquid portion of the fluid, such space containing substantially only the vapor of the fluid, the pressure in the space thereby being substantially equal to the vapor pressure of the fluid which results in, upon there being a temperature differential between any portion of the surface of the wall or walls and a cooler portion of the surface of the wall or walls within the space, some liquid of the fluid boiling at the said higher temperature location and effecting thereby removal of heat as latent heat of vaporization from the higher temperature location through a phase conversion of the fluid to a vapor and thereafter effecting, by condensation of the vapor which effects release of its latent heat of vaporization at said lower temperature location in the space above the said liquid whereby to reduce said temperature differential and, by condensation of vapor at a condenser which is cooled from time to time, the method including the step of effecting a cooling of the condenser by controlling a passage of coolant through the condenser so as to maintain the temperature of the fluid within a selected range.

14. The method as claimed in claim 13 wherein the fluid fills the closed chamber with a liquid portion and a saturated vapor portion.

* * * * *